US005705206A

United States Patent [19]
Ashes et al.

[11] Patent Number: 5,705,206
[45] Date of Patent: Jan. 6, 1998

[54] FEED CONVERSION

[75] Inventors: John Richard Ashes, Wahroonga; Trevor William Scott, Kellyville, both of Australia

[73] Assignee: Commonwealth Scientific and Industrial Research Organisation, Campbell, Australia

[21] Appl. No.: 401,452

[22] Filed: Mar. 7, 1995

Related U.S. Application Data

[63] Continuation of Ser. No. 178,327, filed as PCT/AU93/00213, MAY 11, 1993, published as WO93/22936, Nov. 25, 1993, abandoned.

[30] Foreign Application Priority Data

May 11, 1992 [AU] Australia ................. PL2370

[51] Int. Cl.$^6$ ...................................... A23K 1/18
[52] U.S. Cl. ................. 426/2; 426/656; 426/807
[58] Field of Search ................. 426/2, 98, 657, 426/656, 807

[56] References Cited

U.S. PATENT DOCUMENTS

| | | |
|---|---|---|
| 3,507,662 | 4/1970 | Leroy et al. . |
| 3,541,204 | 11/1970 | Sibbald et al. . |
| 3,619,200 | 11/1971 | Ferguson ................. 426/807 |
| 3,925,560 | 12/1975 | Scott ................. 426/807 |
| 4,042,718 | 8/1977 | Rawlings ................. 426/807 |
| 5,215,766 | 6/1993 | Schaub ................. 426/2 |

FOREIGN PATENT DOCUMENTS

| | | |
|---|---|---|
| 402712 | 2/1969 | Australia . |
| 23456/70 | 6/1972 | Australia . |
| 22832/77 | 9/1978 | Australia . |
| WO91/05482 | 5/1991 | WIPO . |
| 93/00213 | 5/1993 | WIPO . |

OTHER PUBLICATIONS

National Research Council, "Nutrient Requirements of Dairy Cattle" 6th Revised Edition, 1988, National Academy Press, Washington, D.C. pp. 61, 94, 104.

Derwent Abstract Accession No. 89–063666/09 "Active Substances Protected by Coating with Hydrophobic Materials" Jan. 18, 1989, Showa Denko KK.

Derwent Abstract Accession No. 86–002398/01 "Proteins Protected by Coating with Mono–Carboxylic Acids" Jul. 26, 1985, Nippon Soda. KK.

Chemical Abstracts "Protein Protected Fat for Ruminants: IV. Plasma Lipid, Insulin and Depot Fat Composition of Lambs"; vol. 89(9) Aug. 28, 1978, Matu–Fernandez et al.

*Primary Examiner*—Daniel Stemmer
*Attorney, Agent, or Firm*—Campbell & Flores LLP

[57] ABSTRACT

This invention relates to techniques for improving the efficiency of feed conversion, growth and yield of meat from ruminant livestock. There is provided a method of improving the growth rate and modifying the carcass quality of ruminant livestock. The method includes simultaneously feeding to the animal a protected protein meal and, in addition, a protected lipid in amounts which synergistically improve the growth rate and modify the carcass quality.

18 Claims, 1 Drawing Sheet

FEED CONVERSION

This application is a continuation of application Ser. No. 08/178,327 filed May 17, 1994, now abandoned which was a National Phase filing of PCT/AU93/00213, filed May 11, 1993, which was a International Application (PCT) claiming priority of Australian Application Ser. No. PL 2370, filed May 11, 1992.

TECHNICAL FIELD

This invention relates to techniques for improving the efficiency of feed conversion, growth and yield of meat from ruminant livestock.

BACKGROUND ART

The competitiveness of world beef markets is presenting producers with increasing pressures to achieve more efficient feed conversion by animals during the growing and fattening phases of their development. As dietary ingredients account for approximately 70% of the costs associated with feedlotting of ruminants, small increases in the efficiency of feed conversion, growth rate and meat yield can have significant effects on the overall economic profitability of feedlot operations. At the same time, there are wider market opportunities for producers who are able to manipulate carcass characteristics to meet various national preferences.

Hitherto, both the quantitative and qualitative aspects of beef production have generally been approached by providing carefully regulated diets based on traditional feedstuffs, and by the adoption of controlled management practices, such as feedlotting. It has, however, been recognised since the late 1960s that by feeding proteins or lipids which are protected from degradation in the rumen but available for absorption from the abomasum and lower digestive tract, it is possible to improve wool, meat or milk production and to modify carcass fat composition, in particular to increase the unsaturated fatty acid content of the fat.

U.S. Pat. No. 3,507,662 concerns a feed supplement in which the protein content is primarily protected from rumen degradation by cross-linking with natural tannins. The specification includes examples showing that the protein is indeed, protected but there is no exemplification of body weight response.

U.S. Pat. No. 3,541,204 concerns the encapsulation of biologically active substances such as amino acids, vitamins and drugs with hydrogenated fats to protect them from rumen degradation. According to one example, finishing steers fed encapsulated methionine over a 10 week period exhibited weight gains which were of the order of 22% better than those of animals on an unprotected control diet. In another example involving growing/fattening steers, feeding encapsulated methionine over 30 days resulted in weight gains approximately 14% better than those of animals on the control diet.

Australian Patent 402 712 discloses a supplement in which the protein, by treatment with an aldehyde, is rendered insoluble in the rumen but soluble in the abomasum. The invention is particularly directed to increasing wool growth in sheep, however, one example indicates that sheet fed the supplement were likely to experience a 6 to 8% better body weight response than sheet fed an unsupplemented diet.

Australian Patent 450 530 concerns a supplement in which the lipid component is encapsulated within aldehyde cross-linked protein to prevent reaction with rumen contents. The supplement is designed to permit modification (in particular to increase the unsaturation level) of ruminant meat and milk fat, and the feeding of high energy diets without digestive disturbance. The patent does not reveal that the supplement has any effect on growth rate.

More recently, International Patent Application Publication WO91/05482 describes a ruminant supplement in which a protective encapsulating medium is cross-linked using the Maillard browning reaction. The examples demonstrate higher polyunsaturation in the fat of animals fed the supplement, but there is no reference to any effect on body weight.

The prior art, then, has focussed on the gains from feeding a protected protein or from feeding protected lipid, but has not considered the consequences when an animal has access to both such materials.

The present invention makes use of nutritional materials protected against rumen degradation, but offers the possibility of achieving food conversion significantly in excess of that previously reported. Additionally, the invention offers considerable scope for modifying carcass fat/protein ratios to meet market requirements. It is based on the discovery that simultaneous feeding of controlled amounts of protected protein and protected lipid results in increases in feed conversion, growth rate and carcass yield, which are greater than anything that might reasonably have been expected from past experiences of feeding such supplements independently, ie. there is a synergistic effect. Moreover the increases are of a magnitude which will almost certainly prove economically attractive to the producer.

DISCLOSURE OF THE INVENTION

Figure 1:
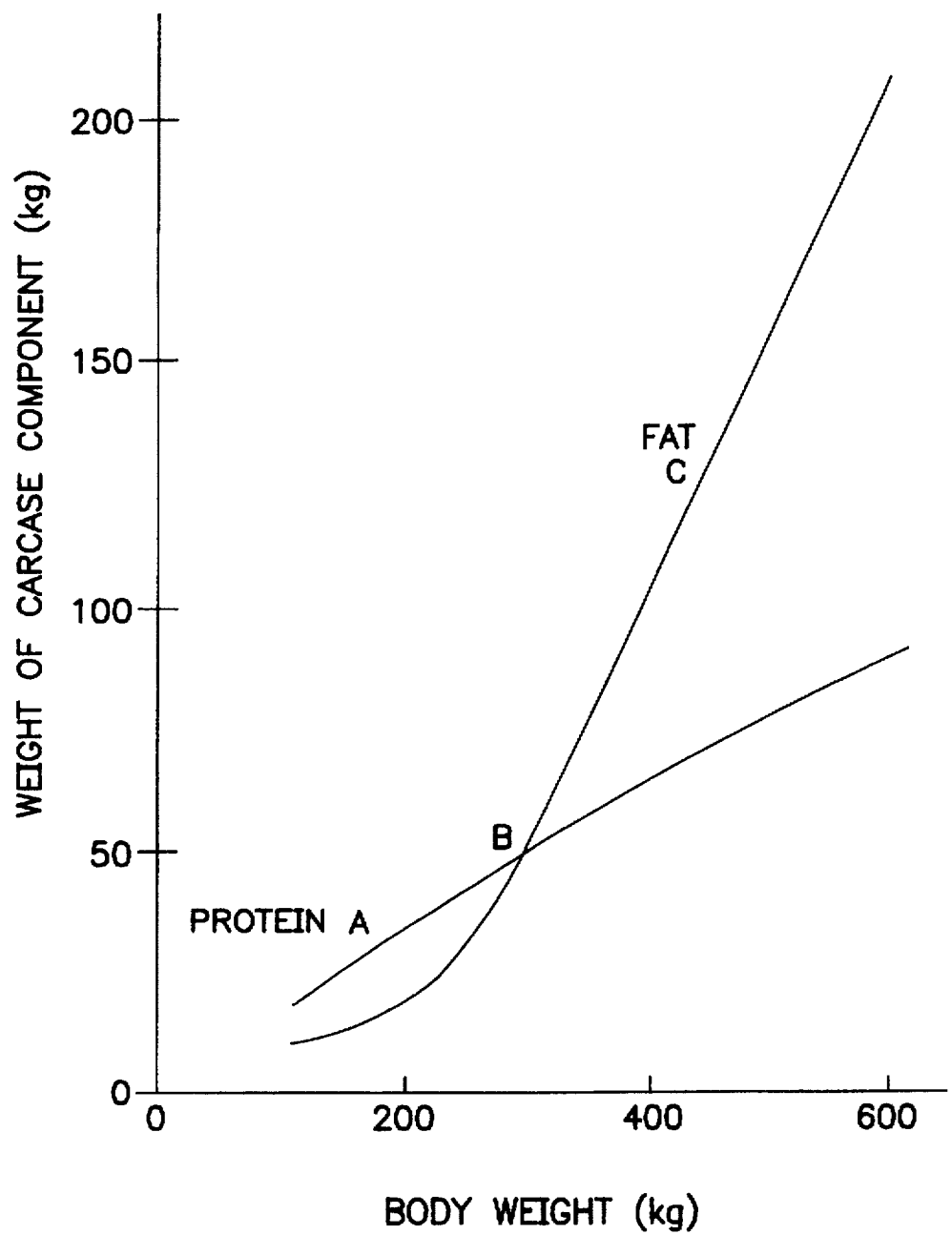
FIG. 1 shows the relationship between body weight and the weight of carcass protein and fat for beef cattle. The period A is the period of maximum muscular development, that is, when weight gain derives mainly from protein production—often called the "growing phase". Following what is called the "breakpoint" (B), there is a period (C) of even greater growth rate which can be attributed to increasing fat deposition, ie. a "fattening phase".

According to the broadest aspect of this invention there is provided a method of improving the growth rate and modifying the carcass quality of ruminant livestock, which comprises simultaneously feeding to the livestock, protected protein and protected lipid in ratios selected to meet protein and energy requirements favourable to the achievement of desired carcass characteristics.

According to another aspect of this invention there is provided a method of improving the growth rate and modifying the carcass quality of ruminant livestock, which comprises simultaneously feeding to the livestock, protected protein and protected lipid in ratios varying from about 3:1 to about 1:1 during the growing phase to about 1:1 to about 1:3 during the fattening phase.

According to another aspect of this invention there is provided a method of improving the growth rate and modifying the carcass quality of ruminant livestock, which comprises simultaneously feeding to the livestock, protected protein and protected lipid in ratios substantially the same as the carcass protein/fat ratios indicated in FIG. 1.

Definitions

In this specification the term "simultaneous" is used to mean feeding within a period of about 24 hours, ie. to realise the benefits of the invention it is not essential that the intake of protected protein and protected lipid takes place at the same time, rather it is important that within a given 24 hour period the animals blood plasma is enriched with both protein and lipid constituents by absorption from the abomasum or lower digestive tract.

By "protected" we mean treated so as not to be fully exposed to the degradative action of the rumen environment, but available for absorption from the abomasum or lower digestive tract. As will be apparent from discussion of the prior art earlier in this specification, a range of techniques have been developed for achieving such protection. Suitable techniques should allow accurate control of the amount of cross-linking that occurs between the protein feedstuffs and the aldehyde; this may be achieved by varying the amount of aldehyde relative to the protein content and its amino acid composition, so that the protein is optimally "protected" from rumen degradation, but may be completely digested and absorbed from the small intestine. For the purposes of this invention the optimal degree of rumen protection lies in the range 50 to 70%, ie. 50 to 70% of the protein content of the supplement will pass undegraded through the rumen. Likewise, dietary fats can be protected from ruminal metabolism by encapsulation in a matrix of cross-linked proteins, and here the preferred window of protection ranges from 65 % to 90%, especially 75% to 90% for fats derived from various sources; ie. 75% to 90% of the fats will pass undegraded through the rumen.

Best Modes of Carrying Out the Invention

In performance of this invention it is likely to be most practical to feed animals a supplement which combines a protected protein and a protected lipid. Typically these supplements will be fed at the rate of about 20% of the total feedlot ration, and the ratio of protected protein to protected fat will vary depending upon the stage of growth and fattening. An economically viable source of both protein and lipid is likely to be oil seed (eg. cotton, sunflower, canola), however it is also feasible to use proteins and fats derived from animal sources (eg. casein, tallow, lard) and this offers the flexibility to select components of the protein-lipid mix according to the relative prices and availability of raw materials.

Regardless of whether the adopted diet involves the supply of protected protein and protected lipid separately or in combination, the invention is not to be construed as requiring the continual, simultaneous feeding of protected protein and protected lipid throughout the growing and/or fattening phases. Clearly the benefits possible from practising this invention can be expected to be related to the continuity and period of feeding the protected materials, and to amounts fed, but other factors such as target markets and cattle specifications, eg. genotype, age, and physiological condition; the to environmental situation (temperature, humidity), should also be taken into account when deciding on the feeding regime to be adopted.

Thus, for the Australian markets, where there is a preference for lighter cattle, eg. having a body weight at slaughter of approximately 350 kg to 400 kg, the feeding of protected protein and protected lipid in the proportions of about 3:1 to about 1:1 for approximately 90 to 100 days would be recommended for optimum feed conversion, growth rate and carcass yield. Whereas in some of the Asian markets, eg. Japan, where meat containing a higher amount of fat and reproducible organoleptic characteristics (eg. texture, flavour) is preferred, the better procedure would be to change the proportion of protected protein to protected lipid from about 1:1 to about 1:3 as the body weight of the animal increases from 400 kg to 700 kg during a 150 day feedlot period. Hence, the invention embodies a practical feeding strategy with considerable flexibility to satisfy the various phases of growth and fattening.

Practice of this invention can be expected to offer economic benefits irrespective of the type of animal in question, however, a particular benefit will be observed with what might be called "high weight" steers, ie. steers above about 400 kg. In a trial (see Example IV) with Hereford cross steers of average weight 470 kg, the feeding of protected protein/lipid supplements during the "fattening" phase resulted in about a 20% improvement in feed conversion, an increase in dressing percentage from 59.7 to 60.7, and, in the case of animals fed the high fat supplement (Group III), the fat content of the carcass was increased by about 10%. "Dressing percentage" is the ratio of hot dressed weight, fat removed, to final live weight reduced by 4% to allow for shrinkage).

The provision of protected feedstuffs in accordance with this invention, should not be seen as associated with any particular ration or dietary component, the invention does, however, offer unexpected additional benefits in certain circumstances. Thus (see Example V) the carcasses of animals fed an oat concentrate ration together with protected protein/lipid supplements during the growing period had 15% less fat content than similar animals fed a barley concentrate and protected supplements, but without any significant reduction in average live weight gain or feed conversion. This can be commercially important because oats can cost up to $AU 40.00 per tonne less than barley, and also because of increasing market interest in low fat meat. Further, ionophores, such as monensin, are widely used in the feedlot industry to improve feed conversion. We have found (see Example VI) that the feeding of protected protein/lipid supplements in association with ionophores during the growing phase can effect dramatic (up to 40%) decreases in carcass fat content-again without any deleterious affect in carcass weight.

The invention will now be described in greater detail by reference to specific examples.

EXAMPLE 1

Preparation of Supplements (a) Protected Protein.

Protected protein was prepared by spraying 37% (W/V) formaldehyde at the rate of 0.7 g formaldehyde per 100 g crude protein into a rapid mixing device containing milled sunflower seed meal (38% crude protein). This material was then transferred to sealed storage for 10 days to give a supplement 60% resistant to proteolysis in the rumen.

(b) Protected Lipid.

Canola oilseed was coarsely comminuted in a hammer mill and mixed with ethoxyquin (150 ppm on an oil basis). This material was then mixed with water to produce a slurry and, after emulsification of the oil and protein in a colloid stone mill, the caustic soda was added to solubilise the oilseed protein. The protein constituents of the homogenised oil seed were cross-linked with 37% (w/v) formaldehyde at the rate of 2.7 g formaldehyde per 100 g crude portion to form a gel which was then dried in a pneumatic drier with an average hot air temperature of 300° C. to complete the reaction and produce a protected lipid that was 85% resistant to metabolism in the rumen in vitro.

EXAMPLE II

Fifty Hereford cross steers, average weight of 290 kg, were assigned to 5 groups of 10 and fed the following barley based concentrate rations for 133 days. The results of the trial are shown in the following table:

| Group | I Control (15% SSM) | II 15% PSM | III 10% PCS | IV 15% PSM + 10% PCS | V 15% PSM + 15% PCS |
|---|---|---|---|---|---|
| Daily gain (kg) | 1.32 | 1.26 | 1.32 | 1.32 | 1.28 |
| Feed/gain (kg/kg) | 7.55 | 7.67 | 7.03 | 6.84 | 6.99 |
| Carcass traits | | | | | |
| Warm weight (kg) | 247 | 247 | 252 | 257 | 257 |
| Dressing percent | 55.6 | 55.5 | 56.8 | 57.7 | 57.6 |

SSM = Sunflower seed meal (NOT protected)
PSM = Protected sunflower seed meal
PCS = Protected canola oil seed In groups IV and V the synergistic effects of feeding protected protein (15% of ration) and protected lipid (10 to 15% of ration) on warm carcass weight and dressing percent are clearly demonstrated. There was also a 9 to 10% improvement in feed conversion (feed gain), which was more pronounced in group IV, ie. where 15% protected protein and 10% protected lipid was fed.

EXAMPLE III

Two hundred Hereford steers, average weight of 280 kg, were assigned to two groups of 100 and received the following barley based concentrate ration. The results are shown in the following table:

| Group | I Control 15% SSM 0% Lipid | II 15% PSM 10% Lipid |
|---|---|---|
| Daily gain (kg) | 1.35 ± 0.016 | 1.49 ± 0.02 |
| Carcass traits | | |
| Warm weight (kg) | 221.8 | 228.7 |
| Dressing % | 55.66 | 57.04 |

SSM = Sunflower seed meal (NOT protected)
PSM = Protected sunflower seed meal

In this trial the synergistic effects of feeding protected protein (15% of ration) and protected lipid (10% of ration) on daily weight gain and dressing percentage are demonstrated; there was a 10% increase in average daily gain and a highly significant increase ($P<0.05$) in meat yield.

EXAMPLE IV

One hundred and sixty Hereford steers of average weight 470 kg were assigned to three groups of 15 and fed a barley (55%)/Silage (8%) ration for 175 days. The results are shown in the following table:

| Group | I Control 10% SSM 0% Lipid | II 10% PSM 10% PCS | III 10% PSM 15% PCS |
|---|---|---|---|
| Daily gain (kg) | 1.21 | 1.31 | 1.36 |
| Feed/gain (kg/kg) | 9.8 | 7.6 | 7.4 |
| Carcass traits | | | |
| Warm weight (kg) | 398 | 410 | 406 |
| Dressing % | 59.7 | 60.7 | 60.4 |
| Fat Depth (mm) (P8 Site) | 27.6 | 27.8 | 31.0 |

SSM = Sunflower seed meal (NOT protected)
PSM = Protected sunflower seed meal
PCS = Protected cotton seed (dehulled)

EXAMPLE V

One hundred and sixty Hereford steers of average weight 292 kg were assigned to two groups of 80 and received either oats or barley concentrates rations supplemented with protected sunflower seed meal (PSM) 15%, and protected cotton seed lipid (PCS) 10%. The results are shown in the following table:

| Group | I Oats + 15% PSM + 10% PCS | II Barley + 15% PSM + 10% PCS |
|---|---|---|
| Daily gain (kg) | 1.47 | 1.57 |
| Feed/gain (kg/kg) | 5.9 | 5.7 |
| Carcass traits | | |
| Warm weight (kg) | 210 | 217 |
| Dressing % | 55.0 | 56.1 |
| Fat Depth (mm) | 12.7 | 15.2 |

PSM = Protected sunflower seed meal
PCS = Protected cotton seed lipid supplement

EXAMPLE VI

Twenty Hereford cross steers of average weight 218 kg were assigned to two groups of 10 and received the following oat-based ration supplemented with protected cotton seed (10%) with (+) or without (−) 320 mg/d monensin. The results are shown in the following table:

| Group | Monensin | I Oats + 15% SSM + 10% PCS | II Oats + 15% PSM + 10% PCS |
|---|---|---|---|
| Daily gain (kg) | − | 1.31 | 1.59 |
| | + | 1.44 | 1.38 |
| Carcass traits | | | |
| Warm weight (kg) | − | 171 | 189 |
| | + | 180 | 170 |
| Dressing % | − | 52.2 | 53.2 |
| | + | 52.5 | 51.1 |
| Fat Depth (mm) (P8 Site) | − | 9.5 | 9.8 |
| | + | 10.3 | 4.8 |

SSM = Sunflower seed meal
PSM = Protected seed meal
PCS = Protected cotton seed lipid supplement

Industrial Applicability

The present invention makes use of nutritional materials protected against rumen degradation, but offers the possibility of achieving food conversion significantly in excess of that previously reported. Additionally, the invention offers considerable scope for modifying carcass fat/protein ratios to meet market requirements. Practise of this invention can be expected to offer economic benefits irrespective of the type of animal in question, however, a particular benefit will be observed with what might be called "high weight" steers, ie. steers above about 400 kg.

We claim:

1. A method of improving the growth rate and modifying the carcass quality of a ruminant livestock animal, which comprises simultaneously feeding to the animal protected protein meal and, in addition, protected lipid in effective amounts for synergistically improving the growth rate and modifying the carcass quality.

2. A method of claim 1, wherein the protected protein meal is derived from an oil seed.

3. A method according to claim 1, wherein the protected lipid is derived from an oil seed or animal lipid.

4. A method according to claim 1, wherein between about 50 to about 70% of the protected protein meal is protected from degradation in the rumen of the animal.

5. A method according to claim 1, wherein between about 65 to about 90% of the protected lipid is protected from degradation in the rumen of the animal.

6. A method according to claim 1, wherein between about 75 to about 90% of the protected lipid is protected from degradation in the rumen of the animal.

7. A method according to claim 1, wherein the ratio of protected protein meal to protected lipid varies with the stage of growth of the animal.

8. A method of improving the growth rate and modifying the carcass quality of a ruminant livestock animal, which comprises simultaneously feeding to the animal protected protein meal and, in addition, protected lipid in effective amounts for synergistically improving the growth rate and modifying the carcass quality, wherein the ratio of protected protein meal to protected lipid is substantially the same as the ratio of carcass protein to fat of the animal.

9. A method of improving the growth rate and modifying the carcass quality of a ruminant livestock animal, which comprises simultaneously feeding to the animal protected protein meal and, in addition, protected lipid in effective amounts for synergistically improving the growth rate and modifying the carcass quality, wherein the ratio of protected protein meal to protected lipid is between from about 3:1 protein to lipid to about 1:1.

10. A synergistic composition for improving the growth rate and modifying the carcass quality of a ruminant livestock animal which comprises protected protein meal and, in addition, protected lipid in effective amounts for synergistically improving the growth rate and modifying the carcass quality.

11. A method of improving the growth rate and modifying the carcass quality of a ruminant livestock animal comprising simultaneously feeding to the animal a feed comprising by weight 15% protected sunflower seed meal and 10% to 15% protected canola oil seed.

12. A method of improving the growth rate and modifying the carcass quality of a ruminant livestock animal comprising simultaneously feeding to the animal a feed comprising grain, 15% protected sunflower seed meal by weight and 10% protected cotton seed lipid by weight.

13. The method of claim 12, wherein the grain is barley.

14. The method of claim 12, wherein the grain is oats.

15. A method of improving the growth rate and modifying the carcass quality of a ruminant livestock animal comprising simultaneously feeding to the animal a feed comprising grain, an ionophore, 15% protected sunflower seed meal by weight and 10% protected cotton seed lipid by weight.

16. The method of claim 15, wherein the ionophore is monoensin.

17. The method of claim 15, wherein the grain is barley.

18. The method of claim 15, wherein the grain is oats.

* * * * *